United States Patent
Laarman

(10) Patent No.: US 7,108,274 B2
(45) Date of Patent: Sep. 19, 2006

(54) CARRIER ASSEMBLY FOR MOVABLY SUPPORTING A FIFTH WHEEL ASSEMBLY

(75) Inventor: Greg Laarman, Holland, MI (US)

(73) Assignee: Jost International, Grand Haven, MI (US)

( * ) Notice: Subject to any disclaimer, the term of this patent is extended or adjusted under 35 U.S.C. 154(b) by 0 days.

(21) Appl. No.: 10/194,036

(22) Filed: Jul. 11, 2002

(65) Prior Publication Data

US 2002/0175493 A1 Nov. 28, 2002

Related U.S. Application Data

(62) Division of application No. 09/798,760, filed on Mar. 2, 2001.

(51) Int. Cl.
*B62D 53/06* (2006.01)

(52) U.S. Cl. .................... 280/438.1; 280/407.1
(58) Field of Classification Search ............ 280/407, 280/407.1, 438.1, 441.1, 405.1, 441, 781, 280/800

See application file for complete search history.

(56) References Cited

U.S. PATENT DOCUMENTS

| | | | | |
|---|---|---|---|---|
| 2,831,735 A | * | 4/1958 | Bennett | 280/407.1 |
| 2,985,463 A | * | 5/1961 | Geerds | 280/407 |
| 3,241,860 A | | 3/1966 | Janeway | |
| 3,369,825 A | * | 2/1968 | Wolf | 280/407 |
| 3,791,664 A | * | 2/1974 | Self | 280/407.1 |
| 3,861,709 A | * | 1/1975 | Mulcahy | 280/407 |
| 4,856,804 A | * | 8/1989 | Nash | 280/430 |
| 5,092,733 A | * | 3/1992 | Kishi | 414/718 |
| 5,449,191 A | * | 9/1995 | Cattau | 280/407 |
| 5,551,552 A | * | 9/1996 | Ophardt et al. | 198/465.1 |

* cited by examiner

*Primary Examiner*—Daniel G. DePumpo

(57) ABSTRACT

A carrier assembly is mounted on the spaced frame members of a tractor for movably supporting a fifth wheel assembly thereon. An integral one piece slide rail is secured to each of the frame members and has a plurality of individual rack sections separately welded to a U-shaped member of the slide rail. Each of the rack sections contain a plurality of spaced teeth. The teeth extend into a channel formed in mounting brackets of a carriage assembly of the fifth wheel to slidably mount the carriage assembly on the carrier assembly. A leg of the U-shaped member extends into a channel formed in the carriage assembly and is engaged by a set bolt to adjust the carriage assembly for various frame widths. A pair of stop assemblies are adjustably movably mounted across the ends of the slide rails of the carrier assembly. A pair of adjustable plungers secure the carriage assembly in a fixed position on the carrier assembly.

20 Claims, 14 Drawing Sheets

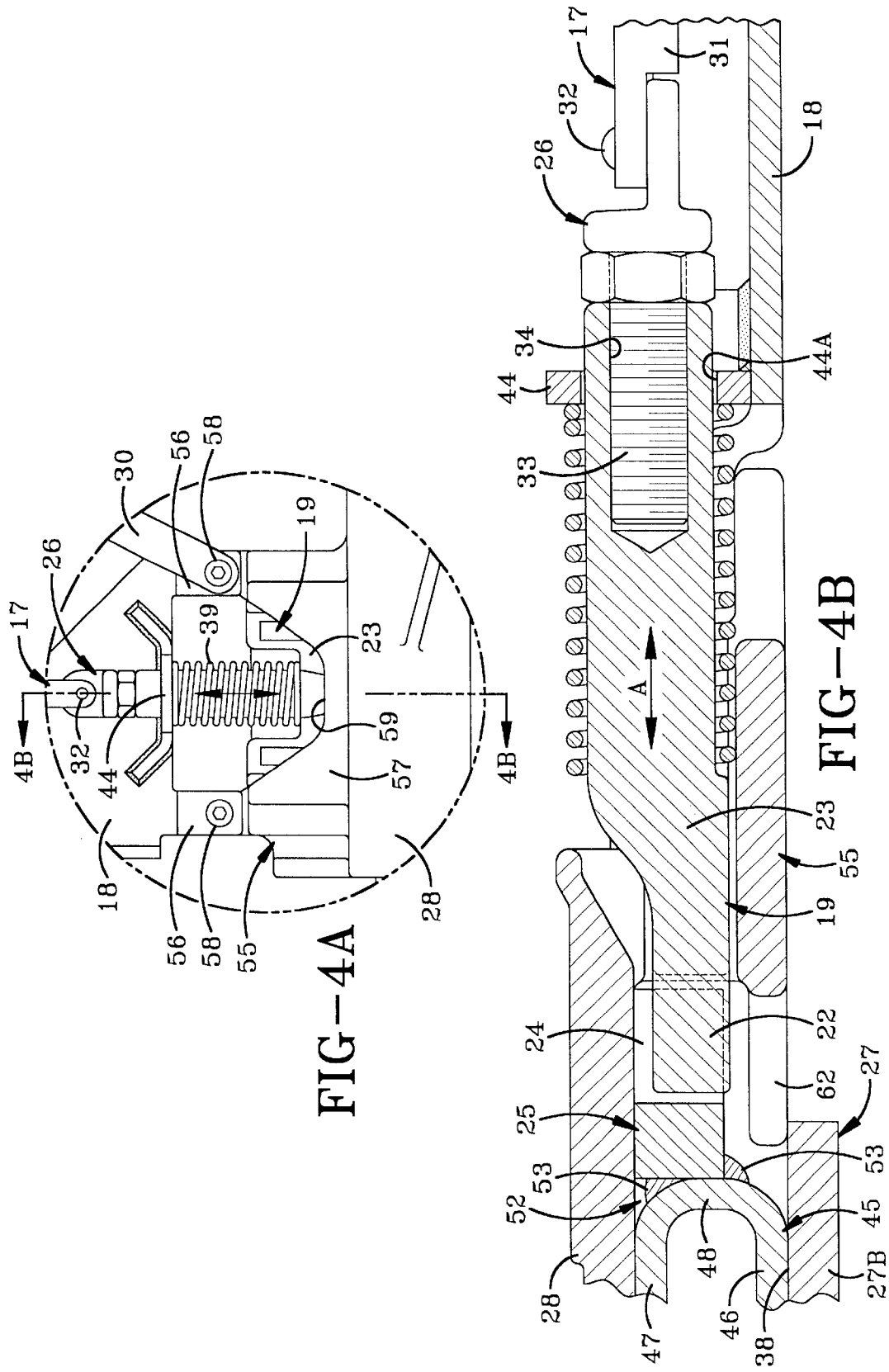

CARRIER ASSEMBLY FOR MOVABLY SUPPORTING A FIFTH WHEEL ASSEMBLY

CROSS REFERENCE TO RELATED APPLICATION

This divisional patent application is based on standard utility patent application Ser. No. 09/798,760, filed Mar. 2, 2001.

BACKGROUND OF THE INVENTION

1. Technical Field

The invention relates generally to fifth wheel assemblies for coupling semi-trailers to tractors. More particularly, the invention relates to a carrier assembly which is mounted on the vehicle frame for movably supporting the fifth wheel supporting carriage. Even more particularly, the invention relates to such a carrier assembly which is adjustable for various width tractor frames and which facilitates positioning and replacement of the carriage on the trailer.

2. Background Information

Large highway freight trailers are usually coupled to a tractor by a fifth wheel assembly may include a top plate and a side bracket or carriage assembly having a locking device which engages the slide bracket in a selected position. The fifth wheel top plate is mounted on the carriage assembly which is movably adjustably mounted on a carrier assembly which is secured to the tractor frame.

These slide plates or carrier assemblies are usually custom made to fit a particular type of tractor due to the size of the tractor frame. For certain applications it is necessary to adjust the position of the carriage assembly on the carrier assembly in order for the locking mechanism to be compatible with the location of the trailer king pin to provide a desired weight distribution on the rear suspension of the tractor. Likewise, this position affects the turning radius that can be achieved between the tractor and trailer. This adjustment of the carrier and carriage assemblies with respect to each other and to the tractor frame is relatively complicated and expensive due to the welding and unwelding of various parts.

Carrier assemblies have various stop plates welded across the ends of the carrier to limit the position of the carriage assembly to prevent excessive movement of the carriage on the carrier assembly resulting in a dangerous turning radius and undesirable weight distribution on the tractor rear wheels. Heretofore, these stop members were welded into position and required breaking of the weld and rewelding the stop plate in a newly desired position, especially when replacing the slide plate assembly for maintenance or adaptability for use with a different trailer.

Another problem with existing fifth wheel assemblies and in particular the carrier assembly therefor, is that the racks along which the carriage assembly is movably mounted and subsequently positioned by a pair of opposed plungers or other retention mechanism, are usually single linear lengths of a rack which require replacement of the entire rack should one of the teeth become damaged. This is an expensive procedure requiring numerous welds to be broken in order to remove the rack and then rewelded along the entire length once the new rack is put in place. Likewise, the cost of the new rack is expensive for replacing only one or several broken teeth.

Still another problem with existing carrier assemblies is the unequal weight distribution of the carriage and slide plate on the carrier assembly resulting in increased maintenance problems.

Another problem with existing fifth wheel assemblies is that the spring biased plungers which secure a carriage assembly in a fixed position on a carrier assembly, may require replacement in order to match a particular width trailer frame. This is expensive and undesirable. Furthermore, over time, the biasing force of the plunger biasing springs will weaken due to wear, temperature and the harsh environment in which they are located, which could cause premature release of the plungers from the carrier rails.

Thus, the need exists for an improved carrier assembly for movably supporting a carriage assembly thereon of a tractor fifth wheel to eliminate problems with prior art carrier assemblies.

SUMMARY OF THE INVENTION

The present invention provides a carrier assembly for movably supporting a fifth wheel assembly of a tractor trailer combination which is readily adjustably mounted on the spaced frame members of a tractor by a plurality of bolts along the length of the frame mounting angle.

Another aspect of the invention provides a carrier assembly having adjustable stop members at opposed ends of the carrier which can be slidably adjusted easily along the length of the carrier in order to properly position the carriage assembly thereon, and which can be easily removed to permit replacement of the carriage and the slide plate assemblies.

Still another feature of the invention is the forming of the carrier assembly slide rails as integral one piece members having a U-shaped portion on which the rack is welded whereby each of the slide rails is easily mounted on the tractor frame member and is able to receive and distribute the weight of the carrier in a more efficient and effective manner.

A further aspect of the invention is forming the racks on the slide rails of a plurality of rack segments, each segment being secured to the slide rail by a pair of welds, whereby only a single segment need by replaced should one or more of the teeth be damaged avoiding the heretofore required replacement of the entire rack.

A feature of the improved carrier assembly is the adjustability of the mounting brackets for the stop members enabling them to be mounted on tractor frame members of various spacings replacing the heretofore single piece stop members that are welded on the space frame members.

Another aspect of the invention is providing locking plungers for securing the carriage assembly in a fixed position on the carrier assembly which are adjustable in length to compensate for different width trailer frames and to ensure a constant spring tensioning force for maintaining the plunger teeth in engagement with the teeth on the carrier assembly rails to prevent premature release.

The foregoing advantages, construction and operation of the present invention will become more readily apparent from the following description and accompanying drawings.

BRIEF DESCRIPTION OF THE DRAWINGS

The preferred embodiment of the invention, illustrative of the best mode in which applicant contemplates applying the principles, is set forth in the following description and is shown in the drawings, and is particularly and distinctly pointed out and set forth in the appended claims.

FIG. 4A is an enlarged fragmentary view of the encircled portion of FIG. 4;

FIG. 4B is an enlarged fragmentary sectional view taken on line 4B—4B of FIG. 4A:

Similar numerals refer to similar parts throughout the drawings.

DESCRIPTION OF THE PREFERRED EMBODIMENT

Figure 1:
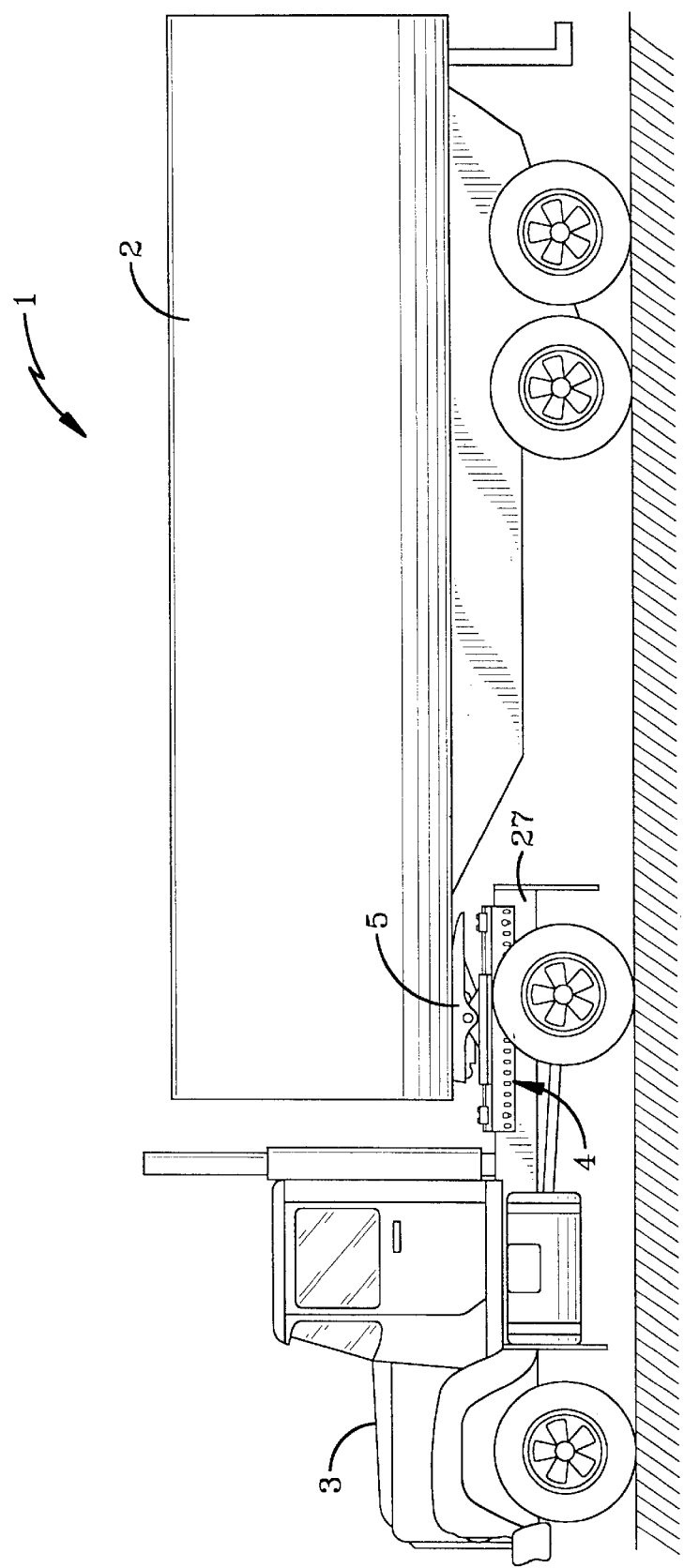
FIG. 1 is a diagrammatic side elevational view of a tractor trailer combination connected together by a fifth wheel assembly.
Figure 2:
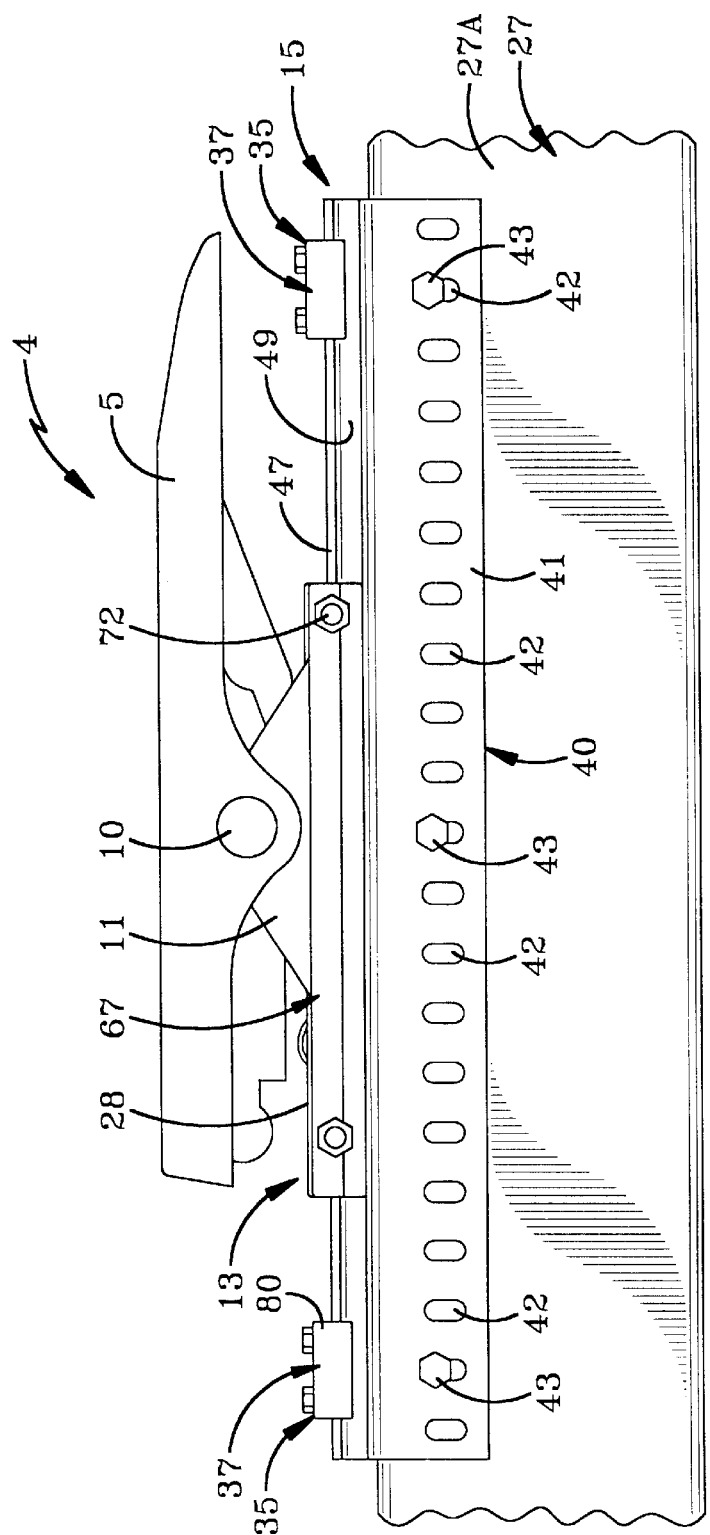
FIG. 2 is an enlarged fragmentary side elevational view of the fifth wheel assembly movably mounted on a carriage which is adjustably mounted on the improved carrier of the invention which is attached to the frame members of the tractor.
Figure 3:
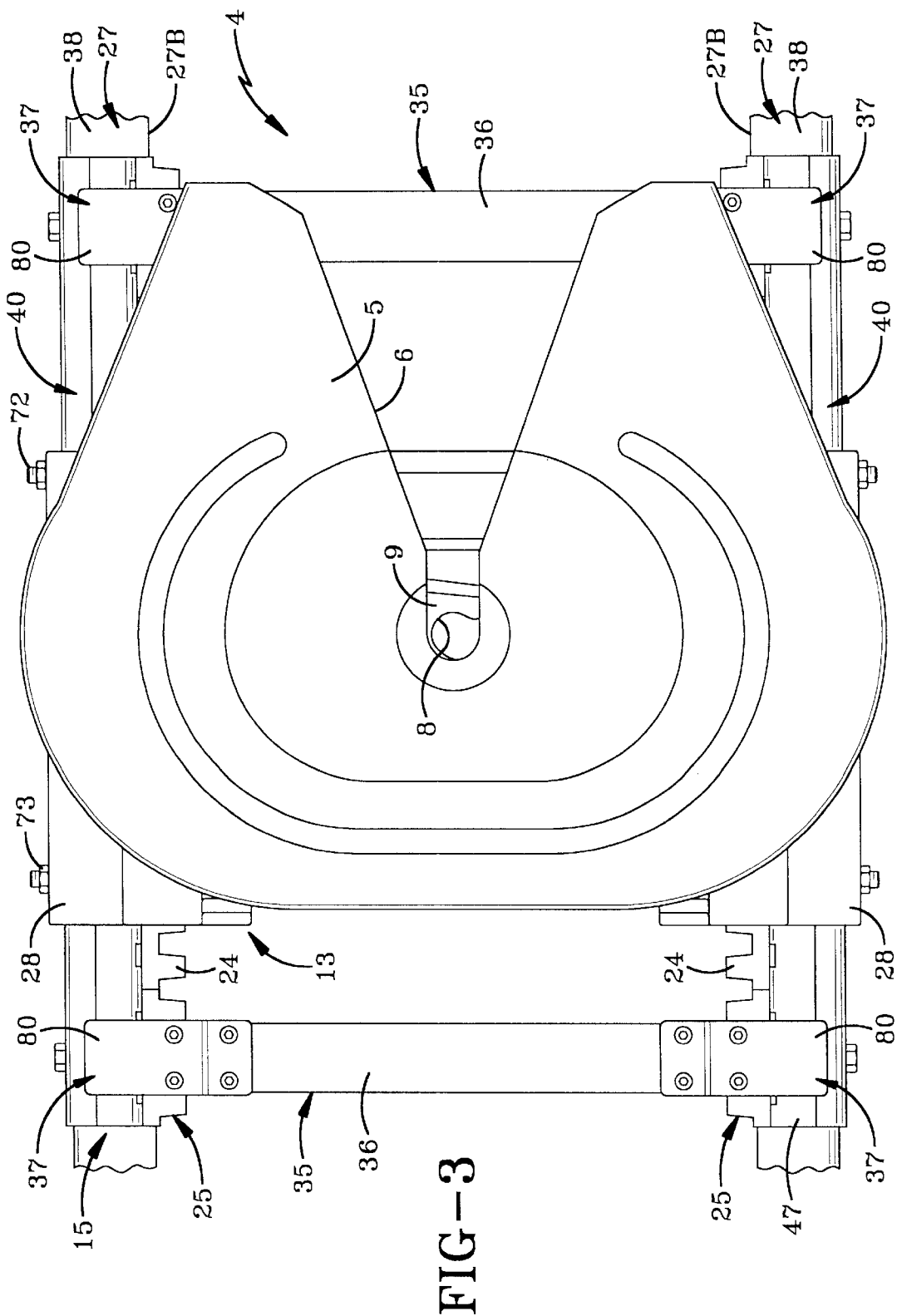
FIG. 3 is an enlarged top plan view of FIG. 2.

FIG. 1 is a diagrammatic side elevational view of a usual tractor trailer combination indicated generally at 1, consisting of a trailer 2 and a tractor 3 connected together by a fifth wheel assembly 4. Referring to FIGS. 2 and 3, fifth wheel assembly 4 consists of a usual top plate assembly 5 having a V-shaped slotted opening 6 for receiving a king pin (not shown) of trailer 2 within the locking opening 8 of a locking mechanism. The particularly construction of top plate 5 and the manner of operating locking mechanism 9 are well known in the art, and thus are not described in further detail. Top plate 5 is pivotally mounted at 10 on a pair of spaced pedestals 11 to permit pivotal movement of the top plate. Pedestals 11 are mounted on a slide bracket or carriage assembly 13 (FIG. 4) which is adjustably movably mounted on the improved slide plate or carrier assembly, indicated generally at 15. The construction of carriage assembly 13 is well known in the art and is only partially shown in FIG. 4 and briefly described below.

Carriage assembly 13 has a plunger assembly indicated generally at 17, which includes a plunger support plate 18 and a pair of movable plungers 19 connected together by an adjustable link assembly 20. Each plunger 19 includes a plurality of teeth 22 which are formed on a plunger plate 23 which is mounted on the outer end of an adjustment screw 26 (FIG. 4B) which is pivotally connected to a pair of links 31 which are pivotally connected by a pin 21 (FIG. 4) at the center of plunger assembly 17. The opposite ends of each link 31 are pivotally connected to adjustment screws 26 by pins 32. Teeth 22 are engageable with teeth 24 of a pair of spaced racks 25 to secure carriage assembly 13 in an adjusted position on carrier assembly 15.

In accordance with one of the features of the invention, adjustment screw 26 includes a threaded end 33 which is threadably received within a threaded opening 34 formed in plunger plate 23 (FIG. 4B). This enables the length of plunger assembly 17 to be adjusted for various width trailer frames and also enables plate 23 to be adjusted with respect to spaced racks 25 as shown by arrow A, FIG. 4B, to change the tension in compression coil springs 39 which bias plates 23 and corresponding teeth 22 toward engagement with the teeth of rack 25. The inboard end of each plate 23 is slidably located within an opening 44A of a mounting plate 44 which is welded to plunger support plate 18.

Figure 4:
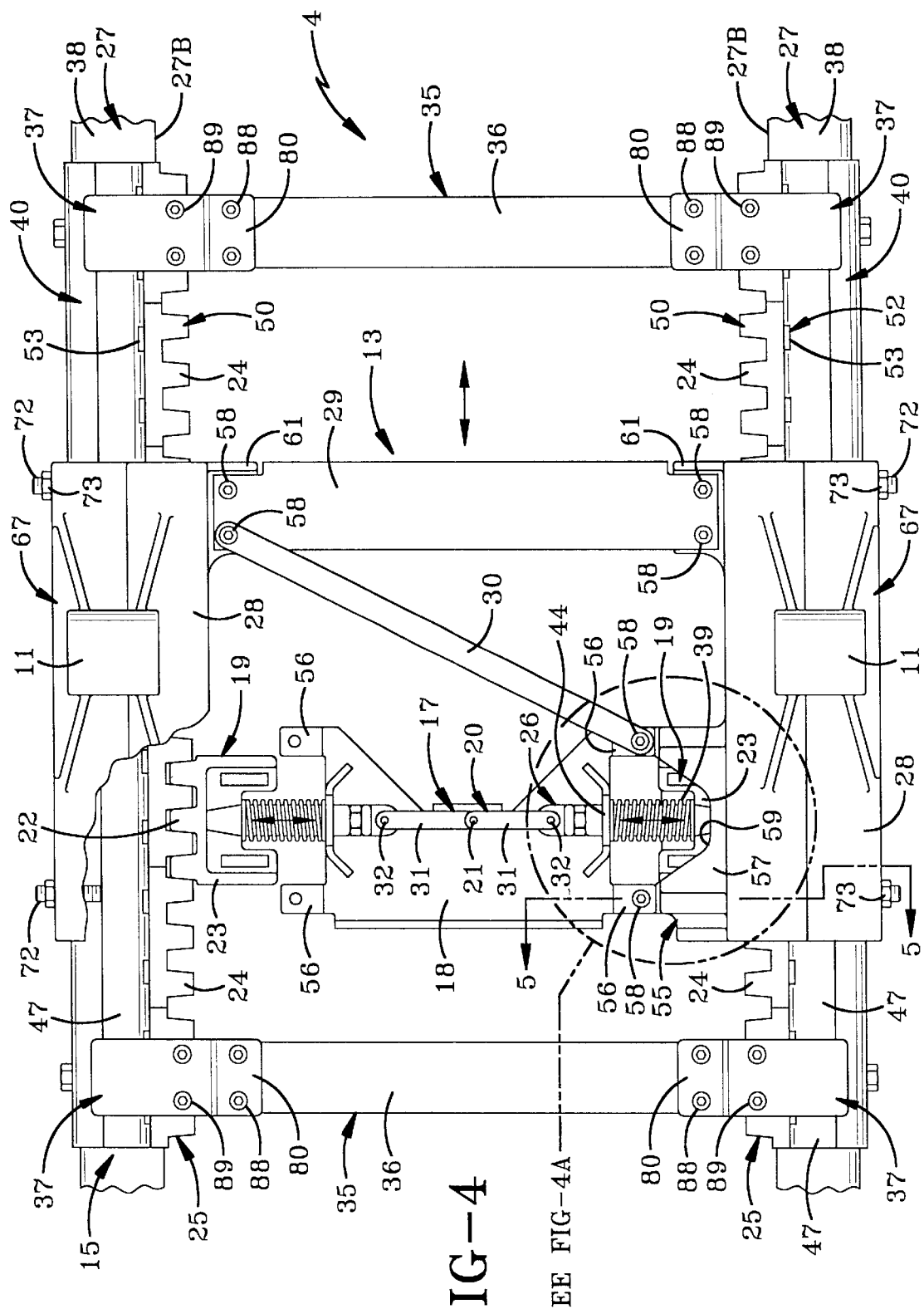
FIG. 4 is an enlarged fragmentary top plan view of the fifth wheel assembly with portions removed therefrom.
Figure 5:
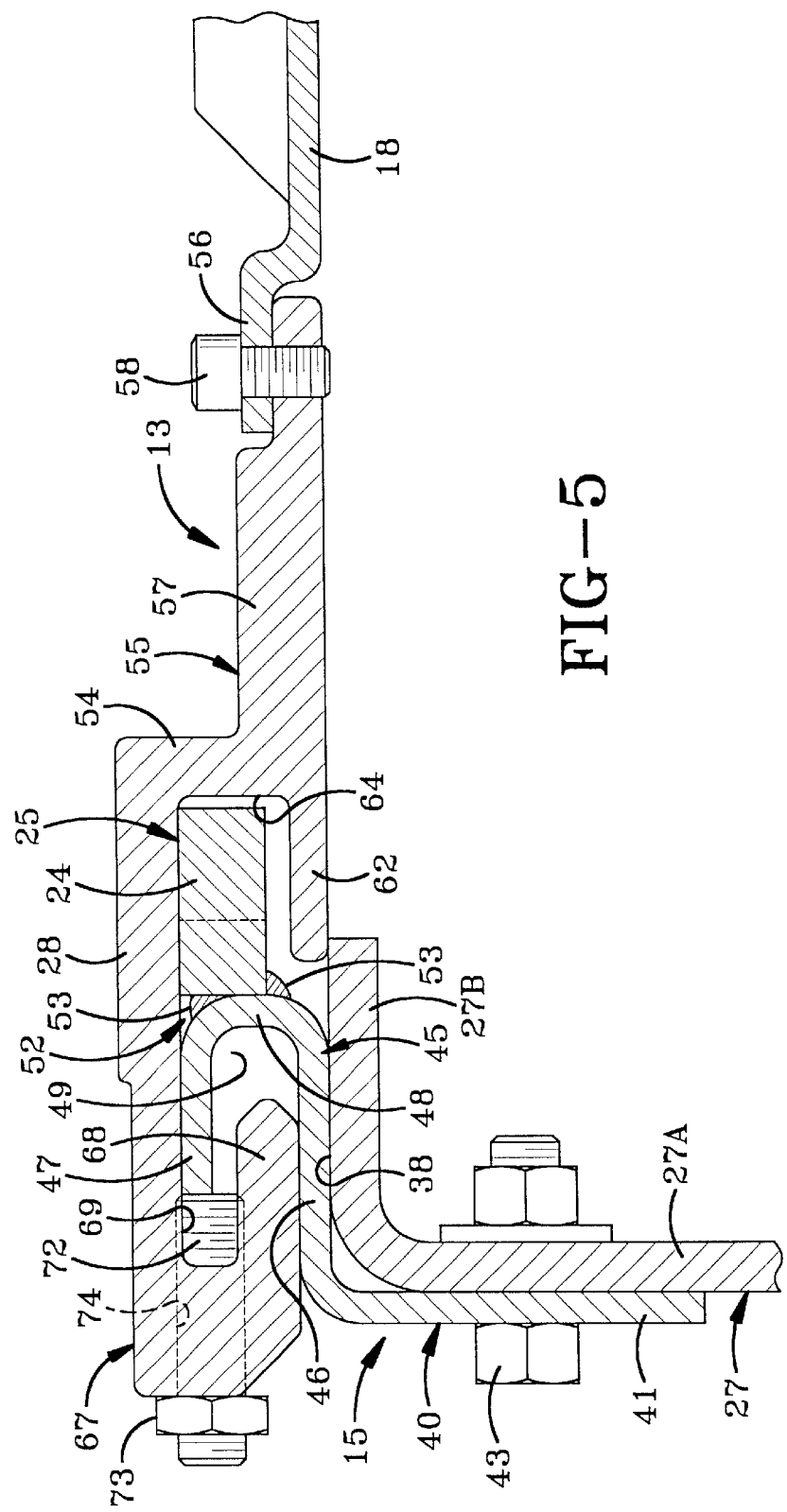
FIG. 5 is an enlarged fragmentary sectional view taken on line 5—5, FIG. 4.

Carriage assembly 13 includes a pair of stepped plates 28 on which pedestals 11 are mounted and further includes a cross plate 29 extending between plates 28 for stabilizing carriage assembly 13 together with plunger support plate 18. A link 30 extends diagonally between cross plate 29 and plunger support plate 18 to stabilize carriage assembly 13. Carriage assembly 13 includes a pair of mounting brackets 55 extending across the underside of stepped plate 28 for movably mounting carriage assembly 13 on carrier assembly 15 (FIG. 5). Only one bracket 55 is shown in FIG. 4 and is described further below.

Figure 6:
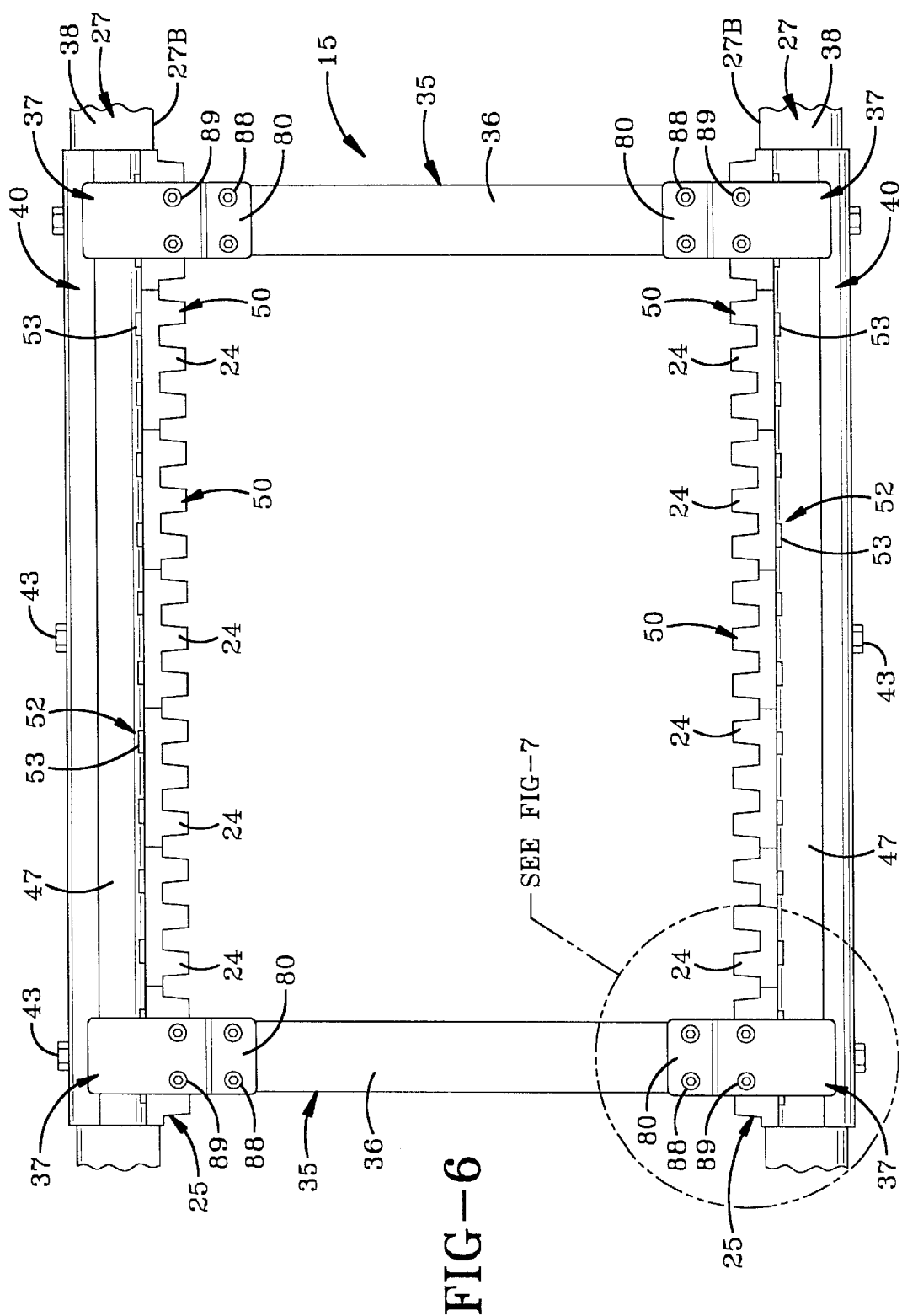
FIG. 6 is a top plan view of the carrier assembly mounted on the spaced frame members of a tractor.

Improved carrier assembly 15 is shown particularly in FIG. 6. In accordance with one of the features of the invention it includes a pair of adjustable end stop members 35, each of which includes a stop plate 36 and a pair of end mounting brackets 37. Carrier assembly 15 further includes a pair of improved slide rails indicated generally at 40, which are mounted on spaced tractor frame members 27 for movably supporting carriage assembly 13 on rails 40 as shown in FIG. 5. Tractor frame members 27 are usually inverted U-shaped or L-shaped beams as shown in FIG. 5 having a vertically extending leg 27A and a horizontal top leg or wall 27B. Slide rails 40 are preferably substantially similar to each other, and thus only one is described in detail and shown in the drawings.

In accordance with another feature of the invention, slide rail 40 (FIGS. 2, 5 and 6) is formed as an integral one piece member of rigid metal and includes a flat vertically extending mounting leg 41 containing a plurality of mounting holes 42 for receiving mounting bolts 43 therethrough for rigidly attaching slide rail 40 to tractor frame leg 27A. Slide rail 40 further includes a U-shaped member 45 formed by a pair of spaced legs 46 and 47 joined by a base 48 which form a U-shaped channel 49 therein. Leg 46 extends from mounting leg 41 and forms a substantial 90° angle therebetween and extends along end and rests upon top surface 38 of tractor frame leg 27B.

In accordance with another feature of the invention rack 25 is formed by a plurality of rack segments 50 which are mounted on base 48 of U-shaped member 45 by a plurality of welded connections 52. Preferably, there are at least two welded connections 52 for each rack segment 50, each connection having upper and lower welds 53. Each rack segment 50 includes a plurality of the individual teeth 24 which extend inboard from U-shaped member 45. In the preferred embodiment rack segments 50 have a linear length of approximately six inches.

Referring particularly to FIGS. 4 and 5, carriage assembly 13 is adjustably movably mounted on carrier assembly 15 by mounting brackets 55 which extend generally throughout the length of pedestal support plate 28 and are secured thereto by pairs of bolts 58. Bolts 58 also extend through and connect link 31 to an outwardly projecting tab 61, a plurality of which extend outwardly from the corners of plunger support plate 18. Bolts 58 also connect tabs 56 to clamp 55, and to a generally U-shaped bracket 57 through which plunger teeth segments 23 extend for engagement with racks 25.

Each mounting bracket 55 (FIG. 5) further includes a U-shaped channel 64 formed by a lower leg 62 and stepped pedestal plate 28. Plate 28 terminates in an outboard U-shaped channel forming member 67 having a lower leg 68 which forms U-shaped channel 69 with stepped plate 28. The cross sectional configuration of brackets 55 will remain similar to that shown in FIG. 5 except for a short section (not shown) opposite of plunger segments 23 whereon the vertical wall 54 extending between bracket 57 and pedestal plate 28 is cut away to permit the passage of plunger teeth segment 23 therethrough.

As shown particularly in FIG. 5, mounting bracket 55 is secured in a selected fixed position on slide rail 40 by a threaded set bolt 72 which is adjustably engaged in a thread hole 74 formed in member 67. The inner end of bolt 72 engages the outer end of leg 47 of slide rail 40, and is secured in the fixed clamping engagement therewith by a lock nut 73. Leg 47 of U-shaped member 45 of rail 40 is received in U-shaped channel 69 with teeth 24 of rack segments 50 extending into U-shaped channel 64.

As can be seen in FIG. 5, slide rail 40 provides various areas on which the weight of carriage assembly 13 is supported, such as the upper surfaces of leg 47 and of teeth 24, leg 27B engaging leg 62, and leg 46 supporting bracket leg 68 on top wall 27B of tractor frame 27. These various areas of support are provided by slide rail 40 for evenly distributing and supporting the weight of carriage assembly 13 through mounting brackets 55.

Figure 7:
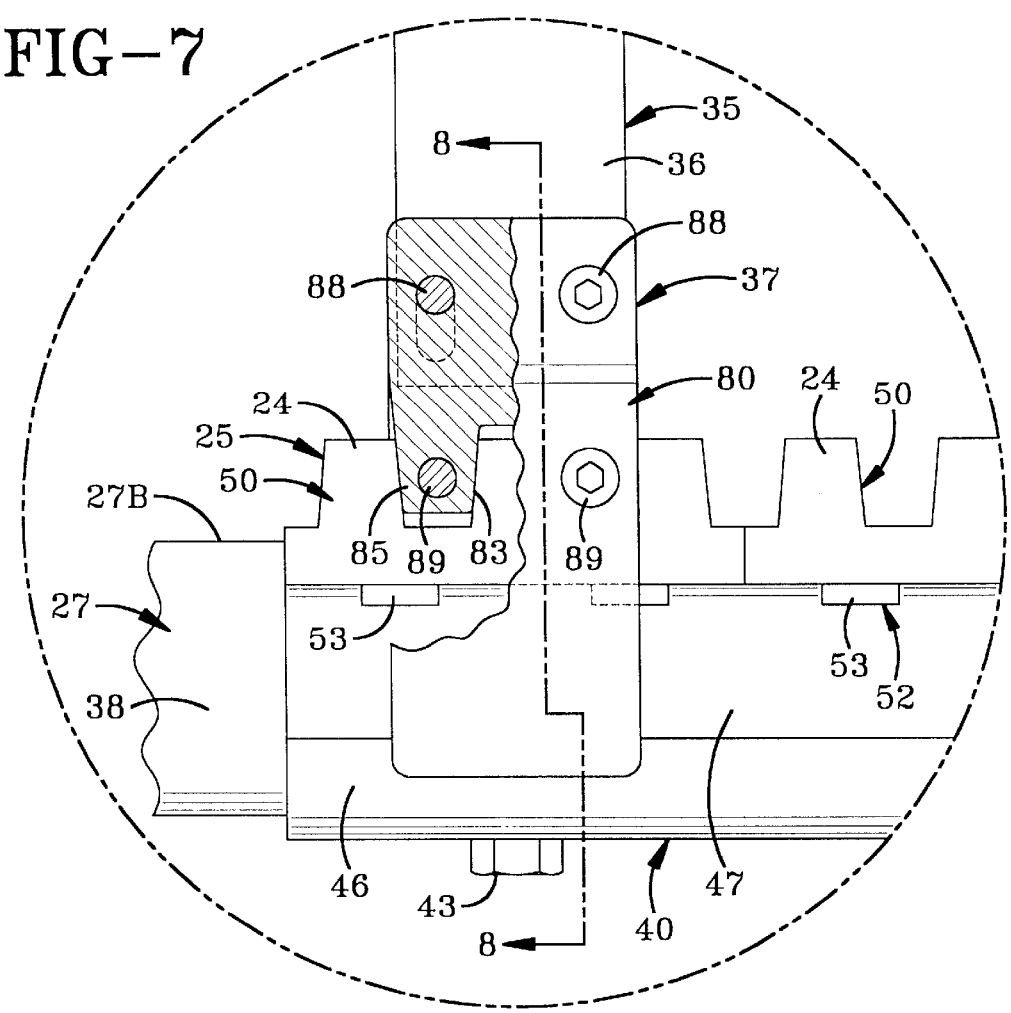
FIG. 7 is an enlarged fragmentary view with portions broken away and in section, of the encircled portion of FIG. 6.
Figure 7A:
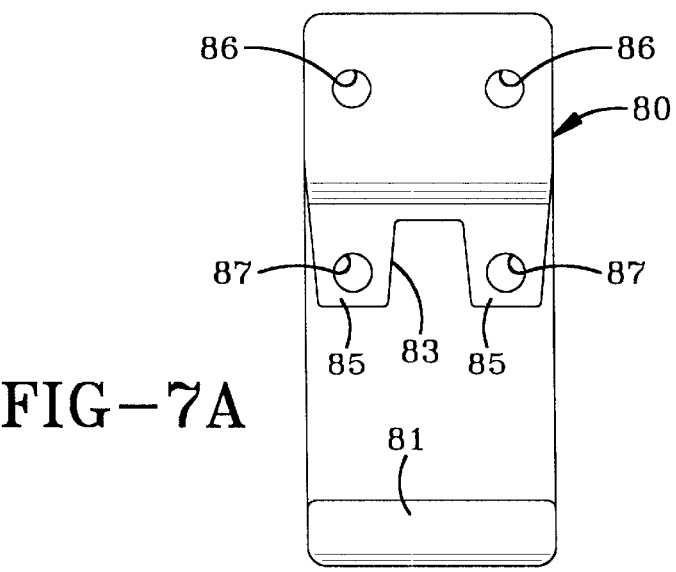
FIG. 7A is a bottom plan view of the stop member mounting bracket of FIG. 7.
Figure 8:
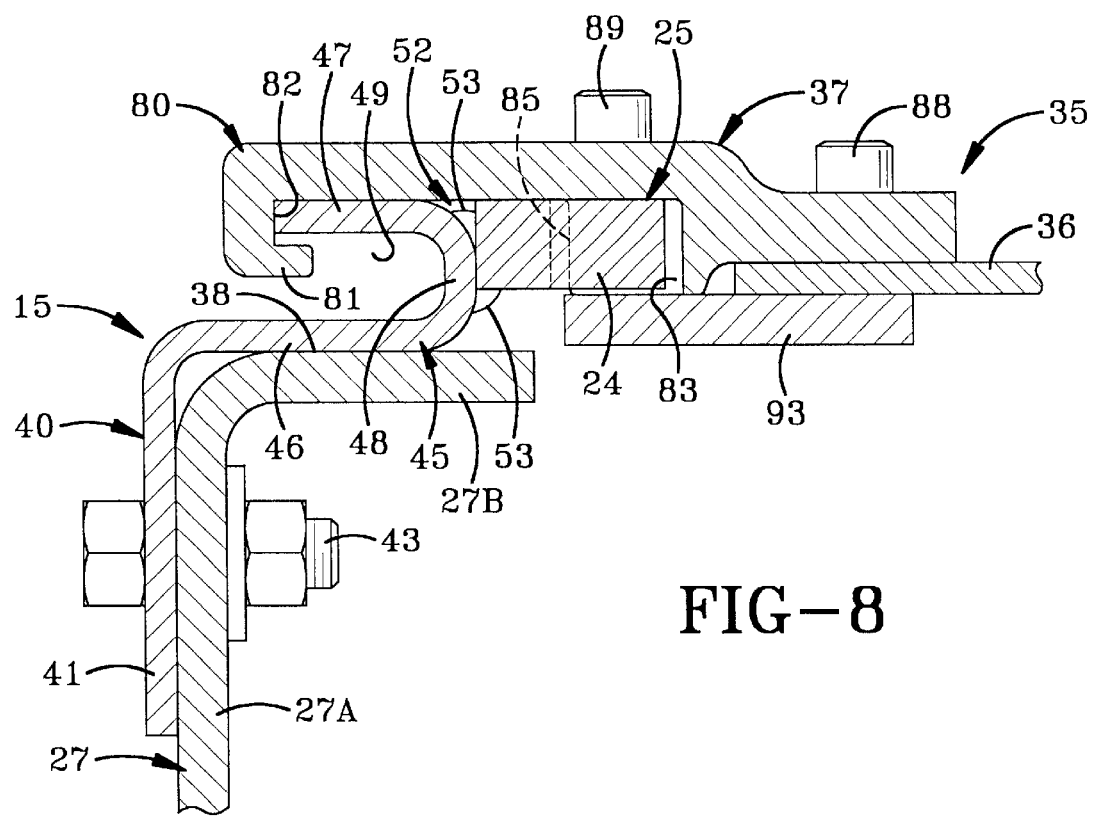
FIG. 8 is an enlarged fragmentary sectional view taken on line 8—8, FIG. 7.
Figure 11:
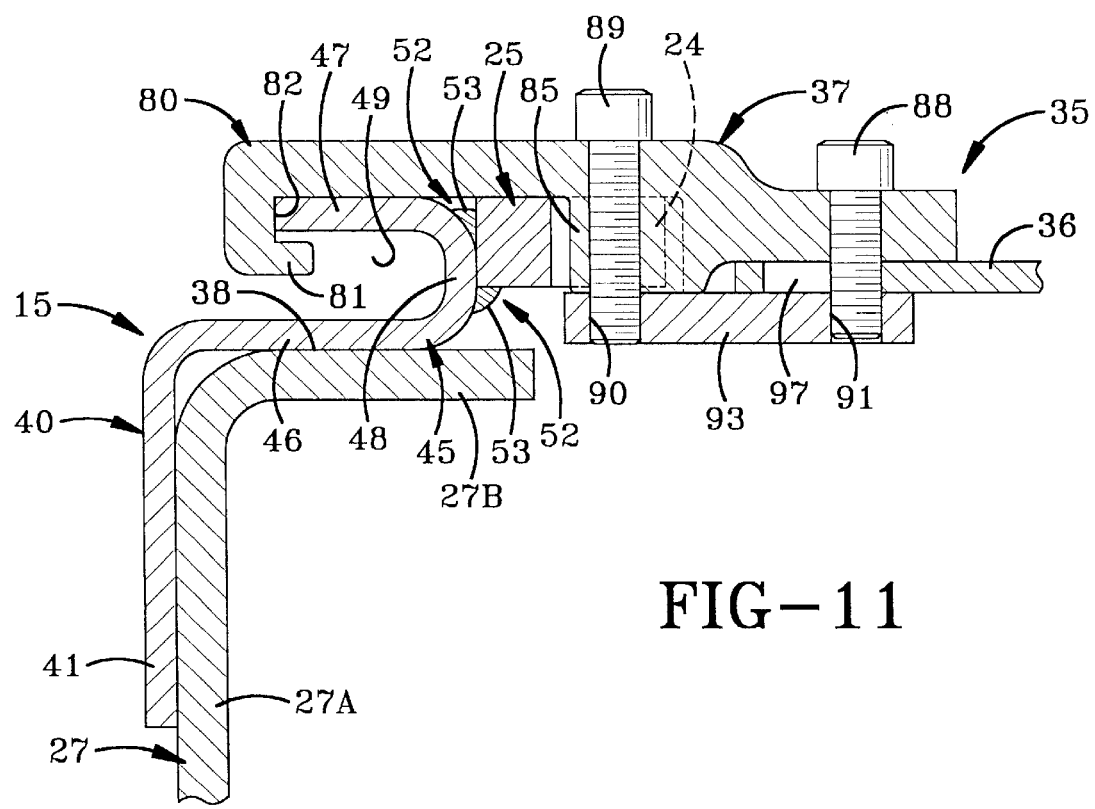
FIG. 11 is an enlarged fragmentary sectional view taken on line 11—11, FIG. 10.
Figure 9:
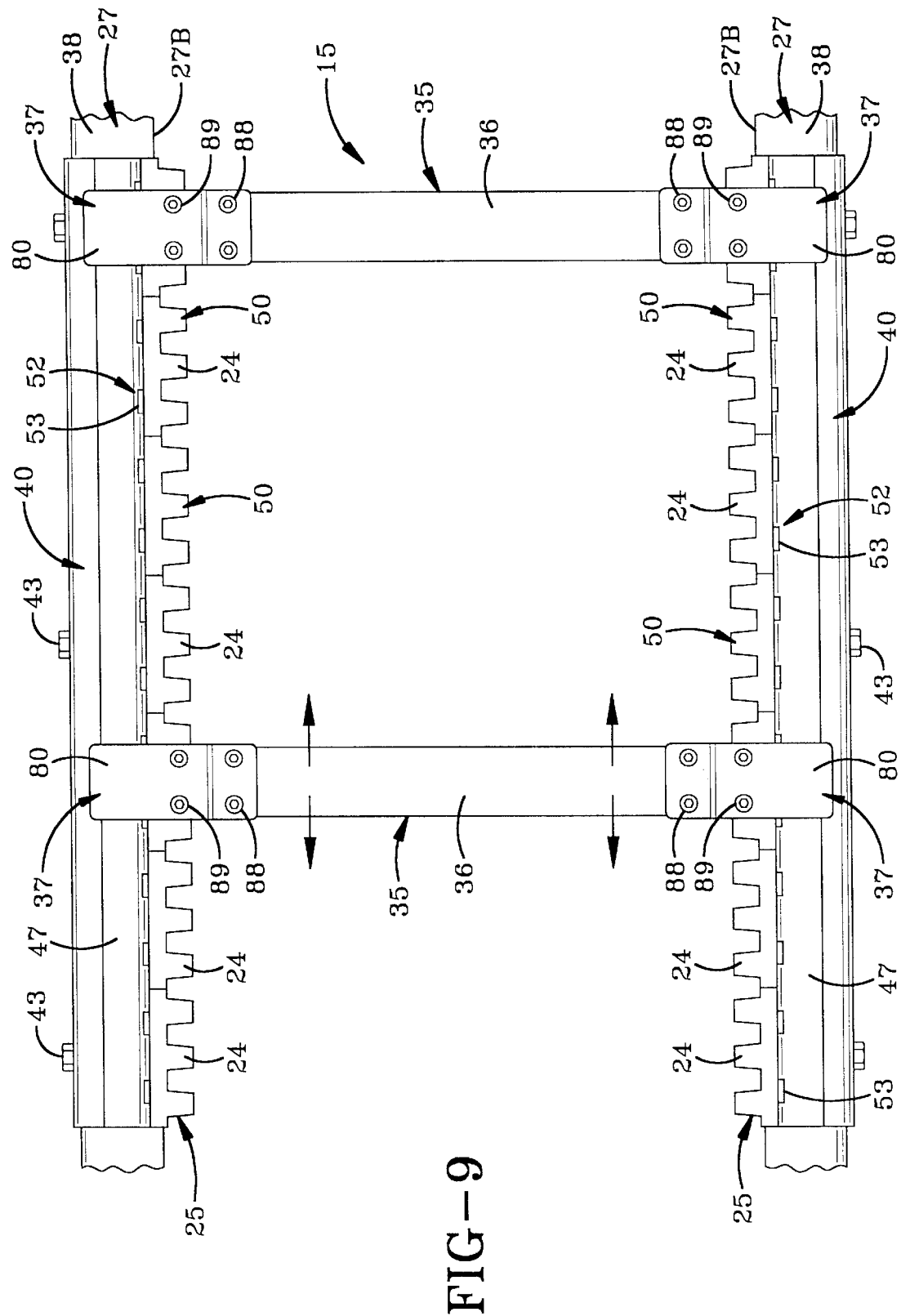
FIG. 9 is a top plan view similar to FIG. 6 showing one of the stop members of the carrier assembly in an adjusted position.
Figure 10:
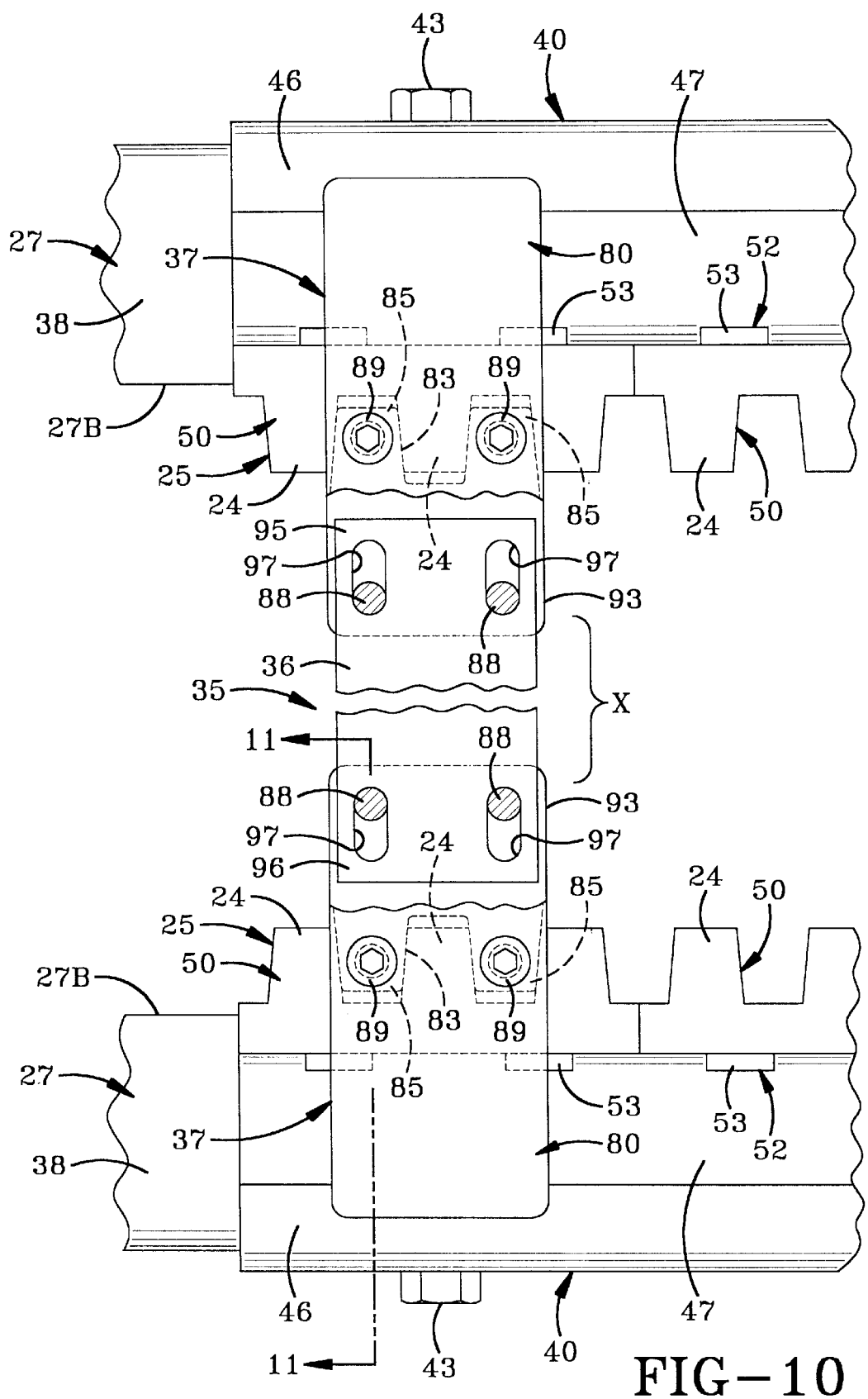
FIG. 10 is an enlarged fragmentary top plan view showing the two mounting brackets of the carrier assembly stop member mounted on the spaced frame members of a tractor.
Figure 12:
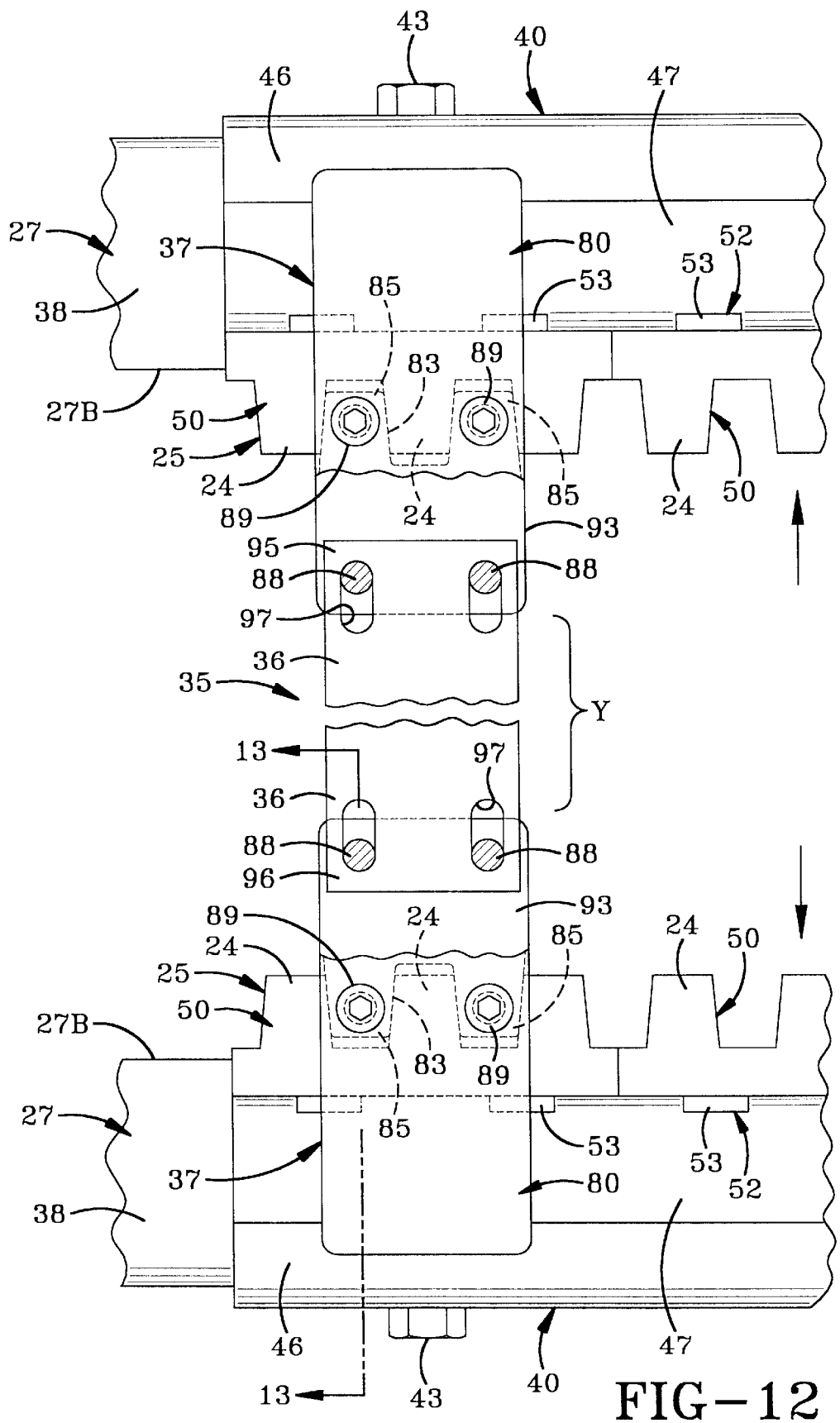
FIG. 12 is a view similar to FIG. 10 showing the stop member mounting brackets in an adjusted position from that of FIG. 10.
Figure 13:
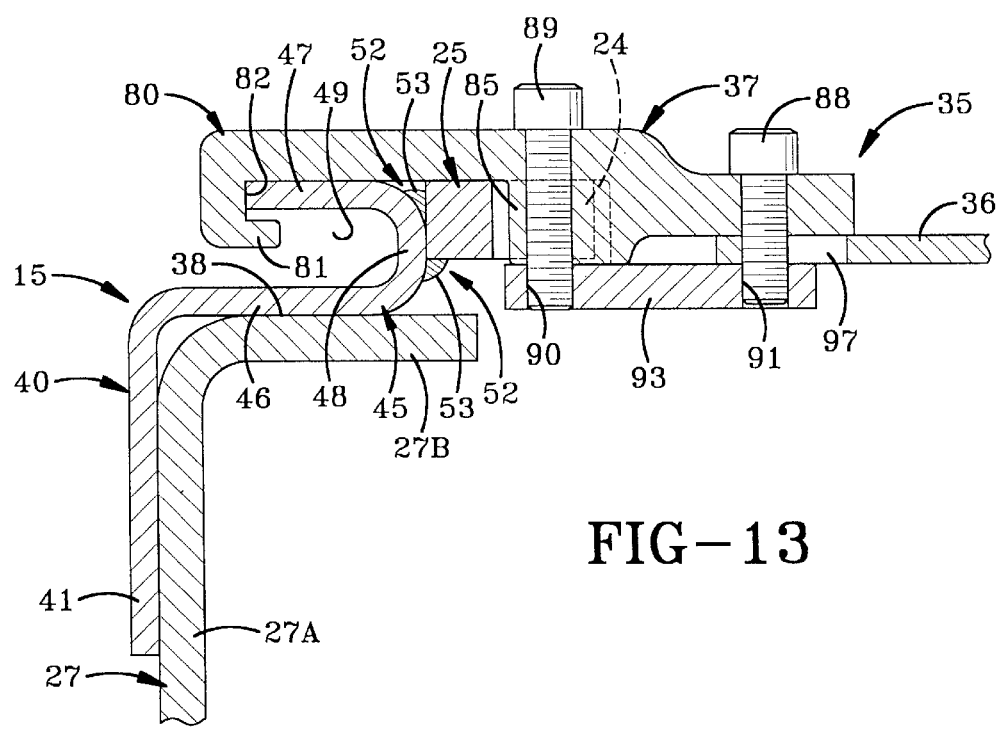
FIG. 13 is an enlarged sectional view taken on line 13—13, FIG. 12.

In accordance with a further feature of the invention, stop members 35 are adjustable in length to accommodate different width tractor frame members as shown particularly in FIGS. 10–12 as well as being movably adjustable along the longitudinal length of carrier assembly 15 as shown particularly in FIG. 9. This width adjustment is obtained by the unique construction of mounting brackets 37. Referring particularly to FIGS. 6–12, each mounting bracket 37 includes a mounting plate indicated generally at 80, having an in-turned end 81 which forms a U-shaped channel 82 for slidably receiving the outer end of leg 48 of U-shaped member 45 therein for slidably adjustably mounting mounting bracket 37 on slide rail 40 (FIGS. 8 and 11). Mounting plate 80 includes a recessed area 83 formed between a pair of teeth 85 into which a tooth 24 extends for engagement with adjacent teeth 85 which engages spaced teeth 24 formed on rack 25 as shown particularly in FIGS. 7 and 7A. Mounting plate 80 includes two pairs of holes 86 and 87 with holes 87 extending through teeth 85 for receiving bolts 88 and 89 respectively therethrough, which are threadably engaged in aligned holes 90 and 91 formed in a bottom clamping plate 93 (FIGS. 8 and 11). Mounting bracket 37 is secured in a selected position along rack 25 by receiving one of the rack teeth 24 in area 83 formed between the pair of teeth 85 formed on the bottom surface of mounting plate 80.

Stop plate 36 is formed with a pair of opposed ends 95 and 96 (FIGS. 10 and 11), each of which is formed with a pair slotted openings 97 through which bolts 88 extend for securing plate 80 in an adjusted position on the ends of stop plate 36. As shown in FIG. 10, stop member 35 is in its shortest position or narrowest width as indicted by bracket X, due to the location of bolts 88 within slotted openings 97. FIG. 12 shows stop member 35 in its longest position or greatest width as indicated by bracket Y, due to the location of stop bolts 89 within slotted openings 97 of stop plate 36.

Thus, carrier assembly 15 is adaptable for use with tractor frames having various spacings without requiring substantial modifications thereto by use of bolts 88 and slots 97. This eliminates any welding as required in prior art carrier assemblies. Carrier assembly 15 is adaptable for various tractors having a range of frame spacings which heretofore required separate specially designed carriers for each particular tractor due to this difference in spacing requiring the welding and permanent fixing of cross members thereon. Likewise, bolts 88 and 89 enable stop members 35 to be easily adjusted across the width of the slide rails 40 and longitudinally along tractor frame members 27 to enable carrier assembly 15 to be adaptable to various tractors and also to accommodate trailers having various king pin locations in order to achieve various weight distributions on the tractor rear wheels, as well as effecting the turning radius of the tractor with respect to the trailer. Heretofore, these adjustments were made permanently by welding fixtures to the carrier assembly and did not permit ease of adjustment in the location of end stop members as in the present invention which is accomplished by a plurality of bolts which are readily loosened and then tightened once the desired adjustments have been accomplished.

Likewise, plunger assembly 17 is easily adjusted as described above, enabling it to accommodate tractor frame members having various spacings therebetween without requiring substantial modifications to the plunger assembly which is achieved easily by the threaded adjustment of adjustment screw 26 in threaded opening 34 of plunger plate 23.

Figure 14:
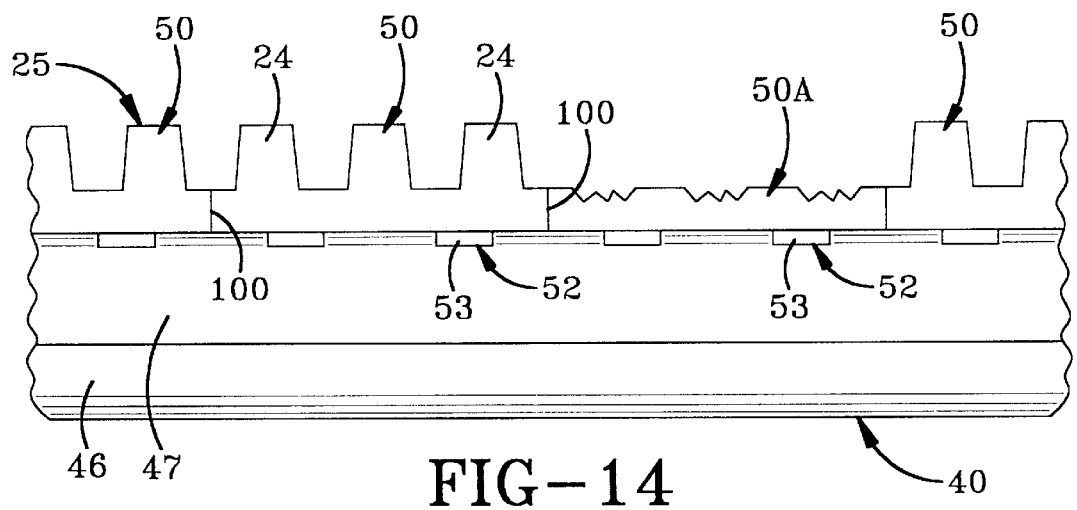
FIG. 14 is a fragmentary side elevational view of the carrier assembly mounted on one of the tractor frame members having a damaged rack segment.
Figure 15:
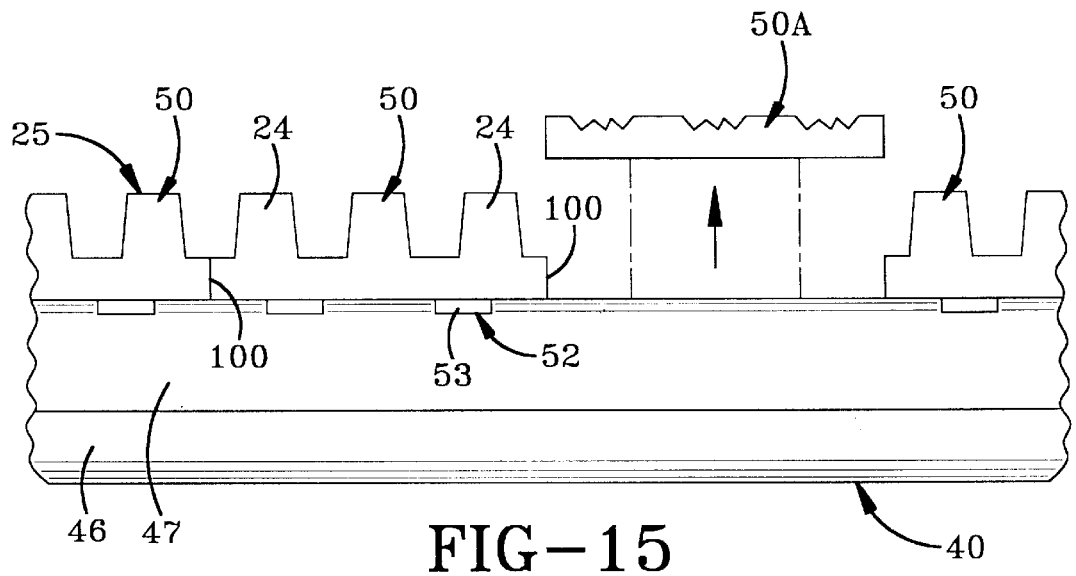
FIG. 15 is a view similar to FIG. 14 showing removal of the damaged rack segment.
Figure 16:
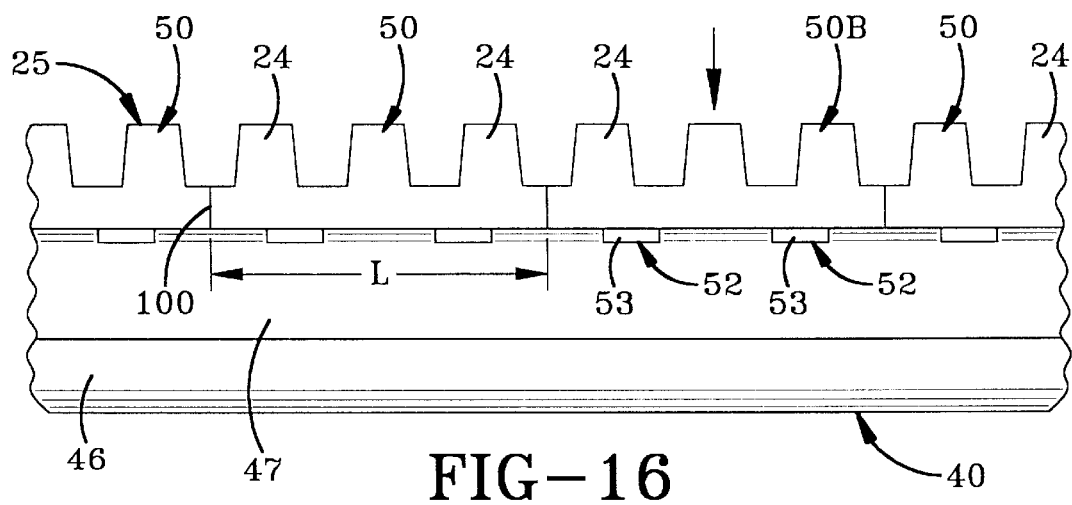
FIG. 16 is a view similar to FIGS. 14 and 15 showing placement of a new rack segment on the carrier assembly.

In accordance with still another feature of the invention as shown in FIGS. 14–16, rack 25 is formed by a plurality of rack segments 50 each of which includes a plurality of the individual teeth 24. The segments are placed in an abutting relationship along slide rail 40 as shown by joint 100. Each segment 50 is secured by a welded connection 52, with each welded connection consisting of top and bottom welds 53 as shown particularly in FIGS. 5, 8, 11, and 13. In the preferred embodiment, each rack segment 50 will have a length L (FIG. 16) of approximately six inches.

This feature enables a damaged tooth or several teeth as shown by rack segment 50A in FIG. 15, to be easily replaced by an undamaged rack segment 50B requiring only two welded connections 52 to be replaced and reapplied. This eliminates the heretofore replacement of the entire rack 25, which in prior carrier constructions was a single longitudinally extending rack formed as a single piece extending throughout the length of the carrier assembly. Thus, replacement of only one short rack segment is considerably cheaper and easier to accomplish then replacing the entire rack as required in prior carrier assemblies.

Accordingly, the improved carrier assembly for a fifth wheel assembly is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the improved carrier assembly is constructed and used, the characteristics of the construction, and the advantageous new and useful results obtained; the new and useful structures, devices, elements, arrangements, parts, and combinations are set forth in the appended claims.

What is claimed:

1. A frame rail for mounting on a frame member of a vehicle for supporting a fifth wheel assembly movably thereon, said frame rail comprising:

an integral one piece member having an attachment leg for securing the frame rail to the frame member and a U-shaped member having a pair of spaced legs extending from an intervening base and forming a slide channel therebetween, the attachment leg extending laterally from one of the spaced legs in a direction away from the other spaced leg; and a rack containing a plurality of teeth attached to and extending from the base of said U-shaped member opposite the slide channel.

2. The frame rail defined in claim 1 wherein the attachment leg is formed with a plurality of holes for receiving fasteners therethrough for attaching said leg to the frame member.

3. The frame rail defined in claim 1 wherein the rack is attached to the U-shaped member by a plurality of welded connections.

4. The frame rail defined in claim 1 wherein one of the spaced legs of the U-shaped member is longer than the other of said legs, and the attachment leg extends from the longer spaced leg.

5. The frame rail defined in claim 1 wherein the slide channel of the U-shaped member is substantially U-shaped in cross section.

6. The frame rail of claim 1 wherein the attachment leg is distal the base of the U-shaped member.

7. The frame rail of claim 6 wherein the spaced legs are substantially parallel to one another.

8. The frame rail of claim 7 wherein the attachment member is substantially perpendicular to the spaced legs.

9. The frame rail of claim 1 wherein the U-shaped member is free of any extension other than the attachment leg which extends from either of the spaced legs away from the other of the spaced legs.

10. The frame rail of claim 1 wherein the spaced legs are substantially parallel to one another and the U-shaped member is free of any extension extending from either of the spaced legs into the slide channel.

11. The frame rail of claim 1 wherein the spaced legs are substantially parallel to one another and the other spaced leg has an outer surface distal the slide channel and the rack of teeth has a lateral surface substantially coplanar with the outer surface of the other spaced leg.

12. The frame rail of claim 4 wherein the attachment leg is distal the base of the U-shaped member.

13. The frame rail of claim 12 wherein the longer spaced leg has an end distal the base of the U-shaped member and the attachment member extends from the distal end of the longer spaced leg.

14. The frame rail of claim 1 wherein the entire attachment leg is substantially flat and free of extensions therefrom other than the spaced leg from which the attachment leg extends.

15. The frame rail of claim 1 wherein the frame rail has a length, the rack includes a plurality of segments each containing a plurality of teeth and each segment is disposed closely adjacent one another along the length of the frame rail.

16. The frame rail of claim 15 wherein each segment has a length of approximately 6 inches.

17. In combination, a frame rail for mounting on a frame member of a vehicle for supporting a fifth wheel assembly movably thereon and an integral one-piece mounting bracket for mounting on the frame rail, the mounting bracket having an outboard portion with an in-turned end forming a U-shaped channel and an inboard portion having at least one tooth extending toward the U-shaped channel, the frame rail comprising:

an integral one-piece member having an attachment leg for securing the frame rail to the frame member and a U-shaped member having first and second spaced legs extending from an intervening base and forming an open-ended slide channel therebetween, the attachment leg extending from the first spaced leg; the slide channel receiving the in-turned end of the mounting bracket when mounted on the frame rail; and a rack containing a plurality of teeth attached to and extending from the base of said U-shaped member opposite the slide channel.

18. The combination of claim 17 wherein the second spaced leg has an end which is received in the U-shaped channel of the mounting member and which engages an outer portion of the mounting bracket when mounted on the frame rail.

19. In combination, a frame rail for mounting on a frame member of a vehicle for supporting a fifth wheel assembly movably thereon and an integral one-piece mounting bracket for mounting on the frame rail, the mounting bracket having an outboard portion defining an inwardly opening first U-shaped channel and an inboard portion having a lower leg forming an outwardly opening second U-shaped channel, the frame rail comprising:

an integral one-piece member having an attachment leg for securing the frame rail to the frame member and a U-shaped member having first and second spaced legs extending from an intervening base and forming an open-ended slide channel therebetween, the attachment leg extending from the first spaced leg;

a rack containing a plurality of teeth attached to and extending from the base of said U-shaped member opposite the slide channel; and the first U-shaped channel receiving the second spaced leg of the U-shaped member and the second U-shaped channel receiving a portion of the rack of teeth when the mounting bracket is mounted on the frame rail.

20. The combination of claim 19 wherein the first spaced leg of the U-shaped member and the lower leg of the mounting bracket are engagingly disposed atop the frame member of the vehicle to provide support for the fifth wheel assembly.

* * * * *